Nov. 29, 1955  G. E. HANSEN ET AL  2,725,076
GUIDED CLOSURE UNIT FOR CHECK VALVES AND THE LIKE
Filed July 3, 1953
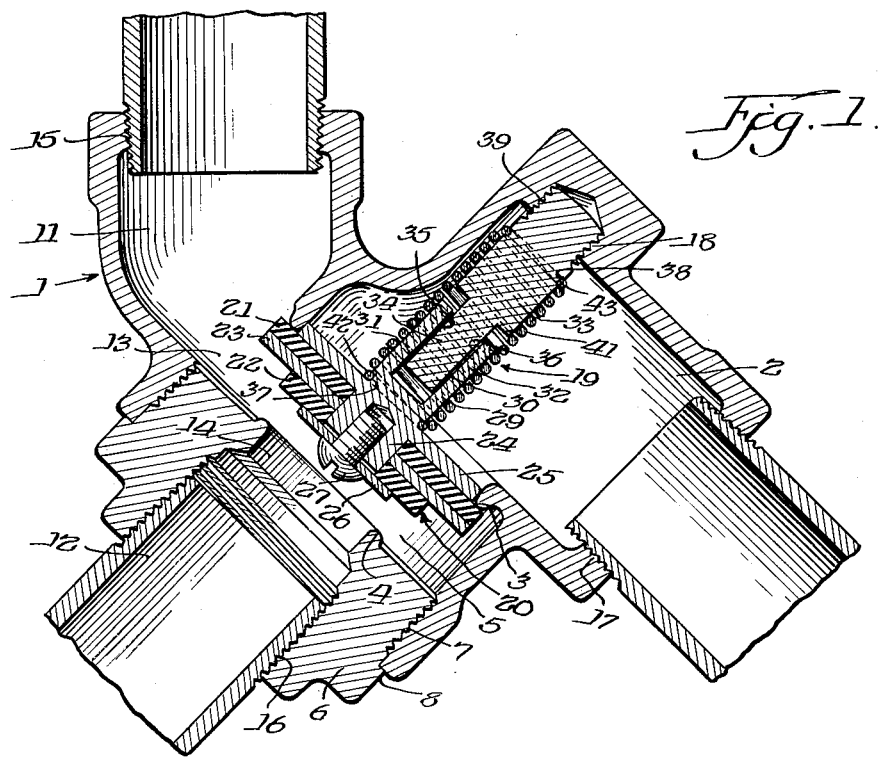
Inventor.
George E. Hansen &
Edward W. Carr

2,725,076

GUIDED CLOSURE UNIT FOR CHECK VALVES AND THE LIKE

George E. Hansen, Elmwood Park, and Edward W. Carr, Cicero, Ill., assignors to Crane Co., Chicago, Ill., a corporation of Illinois Application July 3, 1953, Serial No. 365,848

7 Claims. (Cl. 137—543.15)

This invention relates generally to valves. More particularly, it is directed to a novel closure unit for use in check valves or relief valves, for instance.

It is one of the important objects of this invention to devise a valve and a closure unit therefor which can be easily installed or removed as a complete unit.

Another object is to provide a construction in which the valve closure can be completely assembled prior to installation and stored or handled separately and then mounted within the valve body as a uiit when required during final assembly.

A further object is to provide a valve and a closure unit therefor which is easily installed by simple rotation of the latter into the valve body through the bottom thereof notwithstanding the spring loaded extensible nature of the unit.

A still further object is to provide a valve of a simple design having a self guiding closure not requiring special provisions within the valve body for guidance of the same.

Other objects and advantages will become more readily apparent upon proceeding with the description, read in light of the accompanying drawings, in which Fig. 1 is a sectional assembly view of a valve incorporating the present invention.

Fig. 2 is a similar view showing another application of the invention.

Fig. 3 is a sectional view of the closure unit of Fig. 3 before assembly within the valve.

Similar reference numerals refer to similar parts throughout the several views.

Referring to Fig. 1 of the drawing, the numeral 1 generally designates the valve body or casing having an inlet 2 and a ported seat 3 in fluid communication therewith. In opposed, spaced-apart relation to the seat 3 is a second ported seat 4 providing a space or chamber 5 therebetween. The latter seat is preferably contained in a removable portion or tailpiece 6, for assembly of the closure unit 19 within the valve, said tailpiece being threadedly received within the bottom of the body 1 as indicated at 7. An annular body shoulder 8 limits the inward movement of the tailpiece thereby to provide for predetermined spacing of the valve seats 3 and 4.

Additional avenues of fluid flow leading exteriorly of the valve body are indicated by numerals 11 and 12, the passage 11 communicating transversely with the chamber 5 at 13 while passage 12 extends through the removable portion or tailpiece 6 and includes the port 14 of the ported seat 4 thereof. The outer end limits of these passages may be threaded at 15 and 16 respectively, or the valve body may otherwise be adapted for connection to a pipe line or fittings as indicated. The inlet opening may also be threaded at 17 or otherwise adapted for the same purpose.

It should be noted that the inlet opens downwardly in the position shown, which is the preferred installation, to provide for drainage therefrom, and the passages 11 and 12 are angularly disposed with respect to each other to also provide free fluid drainage therebetween.

The closure assembly or unit generally designated 19 comprises a closure portion 20 for reciprocal movement within the valve chamber 5. This portion has upper and lower disc-like seating elements 21 and 22 of resilient material such as rubber or the like for effecting pressure sealing engagement with the valve seats 3 and 4 respectively, the closure portion normally being held in seated contact with the upper seat 3 by resilient means to be hereinafter described. A metallic stiffener element 23 of generally circular or washer form is interposed between the disc elements 21 and 22, all of which are held on the mounting portion 24 of the closure portion by means of a conventional assembly of a washer 26 and a screw 27 at the lower end thereof. A disc-like top 25 of the mounting portion forms a backing for the upper disc element 21 and further, substantially fills the port opening in the ported seat 3 to confine the inlet fluid upon initial opening or moving of the closure away from seated position with that seat to employ the energy of the inlet fluid for driving the closure member with sufficient force towards the alternate seated position with seat 4 to insure positive fluid tight seating therewith even under relatively low inlet pressure.

In this connection, it should also be noted that the disc element 21 is substantially larger than the element 22. This is to provide additional surface for the inlet pressure to act on for greater force and more responsive movement away from the valve seat 3, together with the action of the confining or piston portion 25 already described. The smaller disc element 22 and the correspondingly smaller effective area upon which the fluid acts in the alternate position, on the other hand, makes it possible for even a relatively light spring to withdraw the closure portion easily to its original position upon the termination or reduction of inlet pressure even against appreciable back pressure or head from vertical piping for instance connected to the upper end portion of the valve at 15.

Further explanation of the details of construction and operation of the valve as thus far covered is not believed necessary since the same structure forms the subject matter of co-pending patent application Serial No. 365,966, filed July 3, 1953.

Proceeding now to the novel features of the present invention, it will be noted that extending from the closure portion 20 and preferably integral therewith a shank portion 29 is provided which is slotted therethrough at 30, having flat, parallel inner walls 31 and 32. Coaxial with the first shank portion is a second shank portion 33 having a reduced extension 34 at the lower end for reception within the said slot 30 in the first shank portion, the said extension being only of slightly less width than the slot and having oppositely disposed flat, parallel sides 35 and 36 for relatively close bearing contact with the side walls 31 and 32 of the slot, respectively functioning for sliding engagement therebetween and facilitating reciprocal movement of the closure and the first shank portions relative to the second shank portion during the actuation of the said closure member.

Extending around both shank portions is a coil spring 41 which snugly receives the same for a purpose to be explained later. Provided at opposite ends of the shank portions, more particularly at the lower end of the first shank portion 29 and upper end of the second shank portion 33, are the annular grooves 37 and 38, respectively for reception of the opposite end portions 42 and 43 of the coil spring 41. The ends of the spring are sufficiently retained and secured within these respective grooves by virtue of the inherent resiliency of the snug fitting spring to stretch the latter between these grooves and stress it in tension to normally retain the closure portion in seated contact with the ported seat 3 and the extensible shank portions in substantially collapsed or shortened condition. The upper end of the second shank portion is threaded at 39 for reception and securement thereof and of the entire closure assembly within the valve body 1 which is threaded at 18 to receive the said assembly. Although the annular groove 38 has been provided in the second shank portion for retention of the spring end 43, it will be understood that the same may be omitted if desired and the threading 39 suitably extended downwardly for engagement therewithin by said spring end and securement thereof in substantially the same manner.

It should be noted that the valve body 1 is of comparatively simple design and is not complicated by the presence of special means for guidance and support of the closure member during reciprocal movement thereof, the closure member being substantially self guiding. Support and guidance thereof for proper seating and reciprocal movement is afforded by the close bearing contact of the flat surfaces 35, 36 of the second shank portion with the flat sides 31, 32 of the slot 30 of the first shank portion and the snug reception of the extension 34 within the slot. Since the slot extends laterally all the way through the first shank portion and rigidity and coaxial alignment of the shank portions are not preserved and maintained in the direction of the slot, but relatively transversely thereto, it has been found that sufficient rigidity and guiding action in the direction of the slot is provided by means of the retracting spring 41 which snugly receives the shank portions effectively preventing misalignment and side motion and urging the spring into the collapsed condition.

Another feature of the present invention and one of great importance is that the closure member assembly is unitary and therefore it can be completely assembled prior to installation and stored or handled separately and then mounted within the valve body as a unit when required during its final assembly. This provision constitutes a great convenience in making up the valve and results in increased efficiency in production. This desirable arrangement is accomplished by the use of the coil spring 41 secured at each end to the respective shank portions, which besides urging the closure into seated position with valve seat 3 when assembled within the valve body, also holds the shank portions and the closure assembly together before installation within the valve body. Also contributing to this beneficial arrangement is the interlocking formation of the shank portions which besides providing stiffness and guiding action to the closure member during the opening and closing of the valve also holds the shank portions in the proper position with respect to each other before mounting within the valve body to facilitate the handling and assembly within the valve. The unitary nature of the closure assembly is of course of importance for effecting prompt and easy removal or disassembly thereof from the valve body as well for expediting inspection, cleaning, or replacement of parts or for the inspection and maintenance of the valve body itself.

Of special significance to the overall objective is the ease, accuracy and speed with which the closure unit can be mounted within the valve body during final assembly. This result is accomplished by simple rotation of the lower part of the unit as by means of a screw driver applied at 27 in the closure portion 20, which in turn rotates the integral shank portion 29 and the second shank portion 33 which is thereby revolved into threaded engagement with the valve body for fixed positioning therewithin. It will be clear that the latter rotative force is transmitted between the shank portions and across the resiliently retained extensible connection thereof by means of the slotted formation in the first shank portion 29 and the flat sided extension 34 of the second shank portion fitting thereinto, the first shank portion turning the second in a simulated screw driver connection into tight engagement within the body. Thus, the slotted engagement between the shank portions serves an additional purpose besides providing extensibility for opening and closing of the valve, guidance and proper positioning of the closure member during such operation, and interlocking of the shank portions for handling of the closure unit before and during assembly into the valve body, as brought out above.

It should be noted that the valve body 1 can be made very compact and also of extremely simple form by virtue of the unitary self guiding nature of the closure assembly of this invention. The latter assembly is supported at but a single point and it requires less space for mounting, which can be done by simple rotation through the bottom of the body, even by one hand.

It is thus evident that a unique closure assembly or unit has been produced for use in a simplified valve design.

Although a double seated two-way lift check type valve has been illustrated similar to that of the co-pending application alluded to, the second seat 4 and disc element 22 could, of course, be eliminated and the piston portion 25 of the closure member as well, if desired for ordinary check valve operation.

Also, a tension spring does not necessarily have to be used for this invention.

Figs. 2 and 3, for example, illustrate the employment of a compression spring in a relief valve.

Referring more particularly to these figures, the numeral 50 generally designates the valve body which is provided with a side port or opening 51 as in the case of the valve body 1, except here it functions as the outlet rather than inlet, and a second opening which is the inlet 52 is applied at right angles to the other and in fluid communication therewith. The body may of course be adapted as by threading at 53 and 54 for connection to pipe lines or fittings (not shown). The valve body is hollow at 55 for receiving the valve closure member assembly generally designated 60. The single valve seat 57, located at the bottom of the hollow interior, is contained in a removable seat portion or tailpiece 56 for reception and assembly of the closure through the bottom of the valve as in the case of the Fig. 1 form. This portion is axially relieved for the passage of fluid therethrough, but the use of a stop flange or shoulder around the outside has been eliminated for a reason to be explained later.

The closure assembly 60 is substantially the same as that of Fig. 1, except for a different form of closure portion 61 having a single seat contacting element 62 in the bottom thereof. This portion has an extending shank portion 29 which is identical to that of the first form except that it is somewhat longer and is so designated by the same numeral. A second shank portion 33, also of substantially the same form, cooperates with the first shank portion and valve body in the same manner and for the same purposes as explained in connection with the description of Fig. 1.

The principal difference, except for the closure portion already mentioned and a slightly longer slotted or extensible engagement clearly indicated in the drawing, is the use of a coil spring 65 which exerts a compressive force rather than one of tension for retaining the closure portion normally in seated contact with the valve seat 57. This action is accomplished normally by abutment of the spring at opposite ends thereof on the inside of the body and the top of the closure portion at 66 and 67, respectively. This spring, however, except for being in compression for retention of the closure in the closed position, extends around and snugly receives both of the shank portions 29 and 33 in the same manner and for the same purpose as in the Fig. 1 disclosure.

The closure member assembly 60 is also capable of being made up as a unit prior to installation and is stored or handled separately and then unitarily mounted within the valve body when required during final assembly, as in the first form described. This result is obtained in spite of the difference in spring action in the mounted or assembled condition, since before such mounting the coil spring 65 is fully extended and is of such predetermined length in that condition as compared to the length of the slot 30 and receiving portion 34 as to hold the extensible shank portions together and secure them in proper operative relation by engagement of the opposite ends of the spring within annular grooves 37 and 38 of the shank portions 29 and 33, respectively as explained in connection with Fig. 1. In this connection, attention is directed to Fig. 3 of the drawing, which illustrates the valve closure member assembly in this premounted unitary condition.

It should be evident that the closure unit can be mounted through the bottom of valve body and rotated into tight engagement with the same at 39 in the same manner as in the case of the Fig. 1 form. In the present instance, however, the shank portions will be in fully extended rather than retracted condition immediately after assembly of the unit because of the compression spring and rotation of the tailpiece 56 behind the unit will bring the shank portions closer together in proper operative position and load the spring 65. When so loaded the spring tends to shift from its engagement within the annular grooves 37 and 38 in the shank portions into abutting relation with the inside of the body at 66 and the top of the closure member portion previously noted. Thus, the desired spring compression can be adjusted for proper relief valve operation by merely screwing the tailpiece 56 in or out of the casing 50 to obtain the proper setting.

Although but a single embodiment has been shown and described, the invention should not be limited to that embodiment or to the details thereof but rather should be gauged by the appended claims falling within the spirit of the invention.

We claim:

1. In a valve having a body and a valve seat therefor, the combination therewith of a self guided closure member comprising a closure portion for fluid sealing engagement with said valve seat, a slotted shank portion extending from said closure portion, a second shank portion substantially coaxial with the first and adapted by means of a flat sided extension to be partly received within the slot of said first shank portion, the flat sides of said extension being in relatively close bearing contact with the sides of the slot in the first shank portion for sliding engagement therebetween and guidance of the latter in closure opening and closing reciprocal movement relative to said second shank portion, said second shank portion being threadedly received within said body of the valve, coil spring means effective to resiliently retain said closure portion normally in the seated position with said valve seat, said coil spring means extending around both of said shank means and snugly receiving the same to afford additional guidance and positioning to the reciprocating closure and first shank portions, said closure portion having means for rotation of the same and said slotted shank portion during assembly within said body whereby said second shank portion is turned therewith in screwdriver fashion and into said threaded engagement within said body.

2. In a valve having a body and a valve seat therefor, the combination therewith of a self guided closure member comprising a closure portion for fluid sealing engagement with said valve seat, a slotted shank portion extending from said closure portion, a second shank portion substantially coaxial with the first and being adapted by means of an extension thereof having a pair of oppositely disposed flat parallel sides to be partly received within the slot in said first shank portion, the flat sides of said extension being in relatively close bearing contact with the sides of the slot in the first shank portion for sliding engagement therebetween and guidance of the latter in closure opening and closing reciprocal movement relative to said second shank portion, said second shank portion being threadedly received within said body of the valve, a coil spring extending around both of said shank portions and snugly receiving the same to afford additional guidance and positioning to the reciprocating closure and first shank portions, means for positioning each end of said coil spring whereby said spring is effective in resiliently retaining said closure portion normally in the seated position with said valve seat, said closure portion having means for rotation of the same and said slotted shank portion during assembly within said body, said slotted shank portion turning said second shank portion in screwdriver fashion into said threaded engagement within said body.

3. A closure unit for assembly within a valve body, said unit comprising a closure member portion, a slotted shank portion extending from said closure portion, a second shank portion substantially coaxial with the first and adapted by means of an extension thereof having oppositely disposed flat parallel sides to be partly received within the slot in said first shank portion, the flat sides of said extension being in relatively close bearing contact with the sides of the slot in the first shank portion for sliding engagement therebetween and guidance of the latter in reciprocal movement relative to said second shank portion to help retain said coaxial relationship between said shank portions, a coil spring extending around both of said shank portions and snugly receiving the same to afford additional guidance and alignment between said shank portions, means for securing each end of said coil spring to each of said shank portions respectively to resiliently retain the extension of said second shank portion within the slot of said first shank portion for unitary handling of the closure member unit before and during assembly within the valve body, said second shank portion being adapted by said reception of the extension thereof within the slot in said first shank portion to be rotated into position within said valve body upon rotation of said closure portion and the shank portion extending therefrom in screwdriver fashion.

4. A closure unit for assembly within a valve body, said unit comprising a closure member portion, a slotted shank portion extending from said closure portion, a second shank portion substantially coaxial with the first and adapted by means of an extension thereof having oppositely disposed flat parallel sides to be partly received within the slot in said first shank portion, the flat sides of said extension being in relatively close bearing contact with the sides of the slot in the first shank portion for sliding engagement therebetween and guidance of the latter in reciprocal movement relative to said second shank portion to help retain said coaxial relationship between said shank portions, a coil spring extending around both of said shank means and snugly receiving the same to afford additional guidance and preservation of alignment between said shank portions, said first shank portion being angularly grooved to receive one end of said coil spring for retention and securement of the same to said shank portion, said coil spring being retained within said groove by virtue of inherent resiliency thereof, said second shank means having at least one groove adjacent the upper end for similar retention and securement of the opposite end of said coil spring, the extension of said second shank portion being resiliently retained within the slot of said first shank portion by said retention and securement of the coil spring to said shank portions for unitary handling of the closure unit before and during assembly within the valve body, said closure member portion having means for rotation of the same and the said shank portion extending therefrom during said assembly, said second shank portion being rotatable by said reception of the extension thereof within the slot in said first shank portion upon rotation in screw driver fashion for mounting within said valve body.

5. In a valve having a body and a valve seat therefor, the combination therewith of a self guided closure member comprising a closure portion for fluid sealing engagement with said valve seat, a slotted shank portion extending from said closure portion, a second shank portion substantially coaxial with the first and adapted by means of an extension thereof having a pair of oppositely disposed flat parallel sides to be partly received within the slot in said first shank portion, the flat sides of said extension being in relatively close bearing contact with the sides of the slot in the first shank portion for sliding engagement therebetween and guidance of the latter in closure opening and closing reciprocal movement relative to said second shank portion, said second shank portion being threadedly received within the said body of the valve, a coil spring extending around both of said shank portions and snugly receiving the same to afford additional guidance and positioning to the reciprocating closure and first shank portions, means for retaining and securing opposite ends of said coil spring to each of said shank portions respectively at opposite ends of the latter whereby said spring is stressed in tension to pull said shank portions coaxially towards each other in collapsed condition and the closure portion into a normally seated position with the said valve seat, said closure portion having means for rotation of the same and said slotted shank portion during assembly within said body, said slotted shank portion turning said second shank portion in screw driver fashion into said threaded engagement within said body.

6. In a valve having a body and a valve seat therefor, the combination therewith of a self guided closure member comprising a closure portion for fluid sealing engagement with said valve seat, a slotted shank portion extending from said closure portion, a second shank portion substantially coaxial with the first and adapted by means of an extension thereof having a pair of oppositely disposed flat parallel sides to be partly received within the slot in said first shank portion, the flat sides of said extension being in relatively close bearing contact with the sides of the slot in the first shank portion for sliding engagement therebetween and guidance of the latter in closure opening and closing reciprocal movement relative to the said second shank portion, said second shank portion being threadedly received within said body of the valve, a coil spring extending around both of said shank portions and snugly receiving the same to afford additional guidance and positioning to the reciprocating closure and first shank portions, said spring being mounted in compression to abut at opposite ends against the valve body adjacent the shank mounting therewithin and the closure portion adjacent the extension of said slotted shank portion respectively to resiliently urge said shank portions into coaxial extension and the closure portion into seated position with said valve seat, the said closure portion having means for rotation thereof and of said slotted shank portion during assembly within said body, said slotted shank portion turning said second shank portion in screw driver fashion into said threaded engagement within said body, a portion of the body containing said valve seat being removable below said closure member, said body portion being adjustably received within said body whereupon during assembly of the same and upon predetermined axial movement within the said body, the said closure member portion is moved upwardly to adjustably load the said spring for predetermined pressure relief setting.

7. In a pressure actuated valve, the combination of a valve body, a reciprocally movable closure member within said body, a seat for the said closure member substantially dividing the said body into oppositely disposed chambers, the said closure member including a pair of shank members mounted in telescoped relation to each other on the said closure member, one of said shank members having means for attachment to an upper portion of the said body, the other shank member being attached to the said closure member, the said shank members being substantially non-rotatable relative to each other, one of said shank members having a reduced or narrow extension receivable in a slotted portion of the other shank member, coiled spring means mounted on the said closure member to substantially encompass the telescoped assembly of said shank members, the said spring means at one end portion being supported by the said closure member and at the other end cooperating with the shank member attached to the said body, the latter shank member cooperating with said body to regulate the resiliency of the said spring means, the said spring means for substantially its entire length being mounted on outer portions of the assembled shank members and being attached thereto at opposite end limits thereof, the said closure member and the said spring means and shank members being removable as a unit from the said body upon predetermined rotation of the said closure member and the said shank members relative to the said body seat.

References Cited in the file of this patent

UNITED STATES PATENTS

| | | |
|---|---|---|
| 1,912,994 | Oishei | June 6, 1933 |
| 2,025,479 | Spear | Dec. 24, 1935 |
| 2,212,600 | Harm | Aug. 27, 1940 |
| 2,404,924 | Sacchini | July 30, 1946 |

FOREIGN PATENTS

| | | |
|---|---|---|
| 8,131 | Great Britain | Apr. 24, 1895 |